(No Model.) 2 Sheets—Sheet 2.

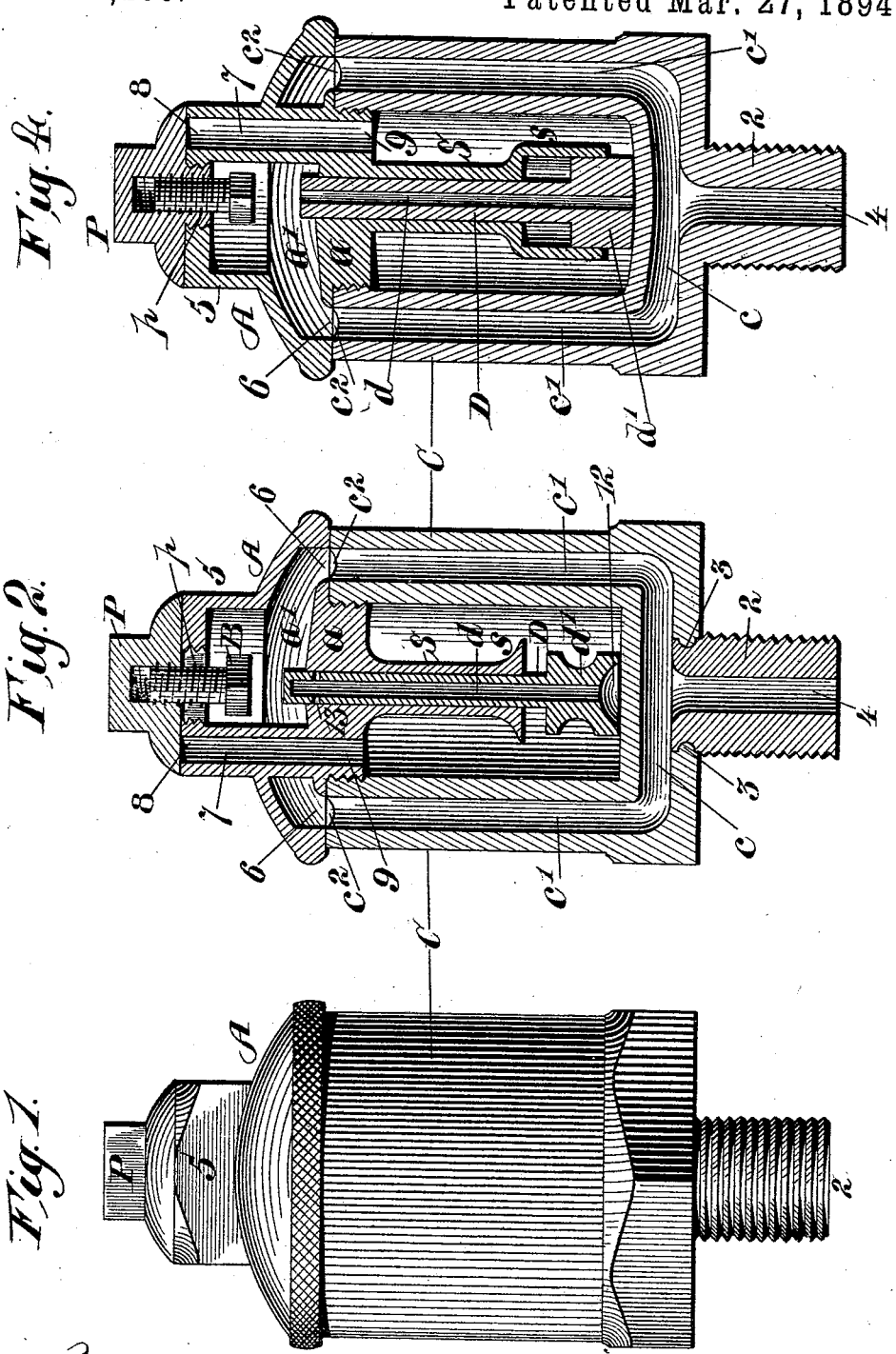

C. A. DELANEY.
LUBRICATOR.

No. 517,266. Patented Mar. 27, 1894.

Witnesses:

Inventor
Chester A. Delaney
By Henry Orth
Att'y

UNITED STATES PATENT OFFICE.

CHESTER ALEXANDER DELANEY, OF RICHMOND, VIRGINIA.

LUBRICATOR.

SPECIFICATION forming part of Letters Patent No. 517,266, dated March 27, 1894.

Application filed December 13, 1893. Serial No. 493,519. (No model.)

*To all whom it may concern:*

Be it known that I, CHESTER ALEXANDER DELANEY, a citizen of the United States, residing at Richmond, Henrico county, Virginia, have invented certain new and useful Improvements in Lubricators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has relation to lubricators, and more particularly to that class of lubricators which are used for the lubrication of moving machine elements, as eccentrics, connecting rods, crank and wrist pins, and other moving machine elements.

The invention has for its object the provision of means whereby the lubricant is automatically supplied in regulated quantities to the part or parts to be lubricated by the reciprocal action of a plunger operated by the centrifugal force of the moving machine element, and working within the body of the lubricant so that the supply of oil ceases with the cessation of motion of the moving machine element.

My said invention has for its further object to simplify the mechanism by means of which the lubricant is supplied to the part or parts to be lubricated, to protect the said mechanism against access thereto of solid foreign matter that would tend to interfere with its function or result in wear, and to strengthen the connection between the lubricator and the part or parts to be lubricated, as will now be fully described, reference being had to the accompanying drawings, in which—

Figure 6:
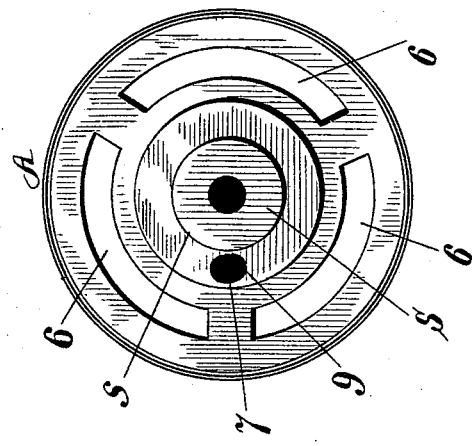
Figure 5:
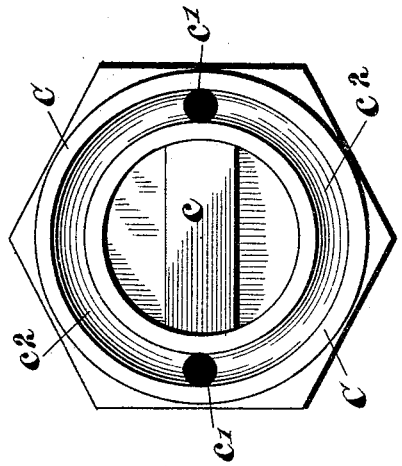
Figure 3:
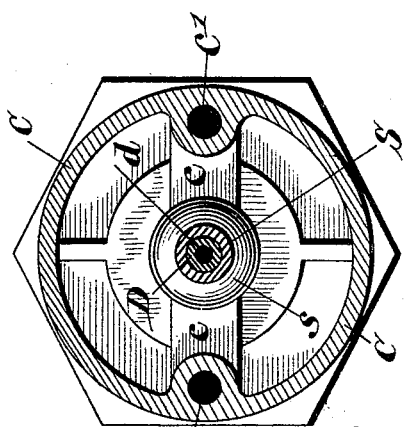

Figure 1 is an elevation, Fig. 2 a vertical section, and Fig. 3 a horizontal transverse section of a lubricator embodying my invention. Fig. 4 is a vertical section of the same illustrating a slight structural modification. Fig. 5 is a top plan view of the cup, the cap removed, and Fig. 6 is an under side view of the cap.

Like symbols indicate like parts wherever such may occur.

So far as I am aware in all lubricators known as force feed, in which the feeding device is operated by the centrifugal force of the moving element, said device consists of a fluid tight piston working within the oil cup to force the oil through a suitable passage to the part to be lubricated. In this construction it is not possible to automatically regulate the volume of lubricant supplied to the machine element or elements in accordance to the work performed thereby, and means are usually provided to regulate the feed, said regulating devices being operated by hand. On the other hand, to admit of the good working of the piston feeder it is necessary to admit air into the cup on one side of the piston, so that whenever the packing becomes loose the lubricant is wasted, and consequently such lubricators require constant attention.

My invention is designed to overcome these difficulties and at the same time materially simplify the construction of the feeding device.

In the drawings C indicates the oil cup whose lower end is polygonal for the reception of a spanner or wrench to screw the cup to the machine element, and said cup may have its stem 2 formed integral therewith, as shown in Fig. 4. I prefer, however, to cast the cup C onto the stem, for the reason that when a lubricator of the kind under consideration is applied to a rapidly oscillating or reciprocating machine element, the strain on the stem owing to the weight of the cup is so great that said stem is frequently wrenched off. In order to more effectually anchor the cup to the stem I form in the latter a groove or grooves 3, at the point of connection, for the metal to run in, and I make said stem of steel. The stem 2 is as usual provided with an oil passage 4 in communication with a like transverse passage $c$ formed in the bottom of the cup C, said passage $c$ being extended vertically at opposite ends, as shown at $c'$ to the upper edge of the cup where said vertical passages $c'$ open into a circular feed groove $c^2$ formed in the upper face of the cup wall at which point the cup has an inwardly projecting flange of a width practically equal to the diameter of said vertical passage, the inner face of said flange being screw-threaded for the reception of the cap A which is provided with a square 5 for the application of a spanner.

The cap A is chambered, and in the bottom of said chamber are formed segmental slots 6 that register with the feed groove $c^2$ in the upper face of the cup C when said cap is screwed thereto. An open-ended supply duct 7 extends through the cap chamber, 8 being the inlet on the upper face of the square 5, and 9 the outlet on the bottom $a$ of the cap chamber $a'$, Figs. 2 and 4. A tubular stem S projects centrally from the bottom $a$ and terminates in a head $s$, and in the square 5 of the cap A is formed an interiorly threaded opening for a screw plug P that has a socket in its threaded shank $p$ in which an abutment bolt B has screw adjustment. In practice I preferably split the shank or stem $p$ of the plug P for the purpose of providing a better hold on the abutment bolt B and a tight joint between said stem and its bearing, and also to facilitate the adjustment of the abutment bolt B in said stem.

The oil feeder, or more properly the oil transferring device consists of a plunger D that has an oil passage $d$ therein and terminates in a head $d'$, in the under side of which I preferably form a concave recess 12. The stem of the plunger D has free motion in the tubular stem S on the bottom $a$ of the cap chamber, the reciprocal movements of said plunger being limited by the abutment bolt B, and as the latter is adjustable in the screw plug P the amplitude of the said movement may be adjusted within certain limits. The oil passage $d$ in the plunger may extend from end to end thereof, as shown in Fig. 4, or said plunger may be closed at its delivery end and provided with peripheral oil delivery ports 13, as shown in Fig. 2, or the latter ports may be combined with a plunger having an oil passage extending therethrough. When the lubricant passage $d$ extends from end to end of the plunger said passage will be closed by the abutment screw when the cup is in an inverted position, one which it may assume when applied to the hub of a loose pulley, so that practically speaking no oil will flow through the plunger when the cup is full and but little oil would flow through the lateral passages or ports 13 and any oil that may pass into the delivery ducts through ports 13 would of course not be wasted.

The abutment bolt B and plunger D I preferably make of steel to prevent their too rapid wear, said abutment having the function of an anvil relatively to the plunger irrespective of its function as an adjusting device for adjusting the reciprocal throw of said plunger.

If desired, the free end of the stem S on the cap chamber bottom may be provided with a tubular guide $s$ for the plunger head $d'$, and the concave recess therein may under some conditions of use be dispensed with, as shown in Fig. 4, without departing from the spirit of my invention.

My improved lubricator differs essentially from the piston feed lubricators in that it has an absolutely air tight lubricant chamber; in that the device for transferring the lubricant from the lubricant chamber to the oil delivery passage works within the body of the lubricant, that is to say, is immersed in the lubricant; in that said transferring device has the function of an immersed pump plunger and can therefore be made extremely light as compared with the weighted pistons, so that neither packing nor buffer springs are required; in that its construction is of the simplest nature; in that the volume of lubricant supplied to the parts to be lubricated may be adjusted by adjustment of the throw of the plunger, since it is obvious that the greater the throw the greater will be the volume of lubricant transferred from the cup to the delivery passage; in that the volume of lubricant supplied to the parts to be lubricated after the throw of the plunger has been adjusted to a given speed of motion of the movable machine element is varied automatically in accordance with the variation in the speed of said element, since it is apparent that the speed of reciprocation of the plunger varies in accordance with the speed of said moving element; and, finally, in that the delivery of lubricant ceases with the stoppage of the moving element.

From the above description the operation of the lubricator will be readily understood, and need not be further described.

Having thus described my invention, what I claim as new therein, and desire to secure by Letters Patent, is—

1. A lubricator of the class described comprising an oil reservoir, an oil duct, and a gravitative body having formed therein an oil passage whose delivery end is adapted to communicate with the oil duct and whose receiving end has motion within the reservoir whereby oil from the latter is forced into the aforesaid duct through the passage of the gravitative body when the said body is set in motion.

2. A lubricator of the class described comprising an oil reservoir, an oil duct, and means for transferring oil from one to the other consisting of a gravitative body provided with an oil passage having an outlet adapted to communicate with the duct, and an inlet within the chamber that is practically closed when said body is in a normal position, said inlet being opened by a change of the body from a normal position, for the purposes set forth.

3. A lubricator of the class described comprising an oil reservoir, an oil duct, and a gravitative body provided with an oil passage whose inlet and outlet are normally closed and adapted to connect the reservoir with the oil duct when the aforesaid body is displaced, for the purposes set forth.

4. A lubricator of the class described comprising an oil reservoir, an oil duct located above the same and a gravity plunger provided with a longitudinal axial oil passage whose outlet is adapted to communicate with the aforesaid oil duct, said plunger normally seated on the bottom of the cup to close the inlet to its passage, for the purposes set forth.

5. A lubricator of the class described, comprising an oil reservoir, an oil duct located above the same, and a gravity plunger provided with an axial oil passage whose inlet and outlet are adapted to communicate with the aforesaid reservoir and oil duct respectively, in combination with an abutment adapted to receive the impact of the plunger, for the purpose set forth.

6. A lubricator of the class described comprising an oil reservoir an oil duct, and a gravitative body provided with an oil passage adapted to communicate with said duct and having its inlet and outlet respectively within and above the highest point of the aforesaid reservoir, in combination with an abutment arranged outside of the lubricant chamber, adapted to receive the impact of the transferring device.

7. A lubricator of the class described comprising an oil reservoir an oil duct, and a gravitative body provided with an oil passage adapted to communicate with said duct and having its inlet and outlet respectively within and above the highest point of the aforesaid reservoir, in combination with means for regulating the throw of said gravitative body, for the purposes set forth.

8. In a lubricator of the class described, the combination with an oil reservoir, an oil receiving chamber, a suitable oil delivery duct in communication with said chamber, and an adjustable abutment within the receiving chamber, of a gravity plunger movable in the plane of the aforesaid abutment and provided with an axial oil passage whose outlet is adapted to communicate with the receiving chamber, and whose inlet is adapted to communicate with the reservoir, for the purpose set forth.

9. A lubricator of the class described comprising an oil reservoir, an oil duct located above the same, and a gravity plunger provided with a recessed head as $d'$, and with an axial oil passage whose outlet is adapted to communicate with the aforesaid oil duct and whose inlet opens into the recess of the plunger head and is adapted to communicate with the aforesaid oil reservoir whereby oil from the chamber is projected into the duct above the same through the axial passage by the movement of the plunger.

10. In a lubricator of the class described, an oil reservoir, a feed chamber located above the same, an oil supply duct extending through the feed chamber, the inlet and outlet of said supply duct open to the atmosphere and to the reservoir respectively, means for closing the said inlet, and means substantially such as described for forcing oil from the reservoir into the feed chamber, for the purpose set forth.

11. In a lubricator of the class described, the combination with an oil reservoir provided with a tubular stem 2, and with a passage leading from the bore of the stem to the upper face of the reservoir, and a cap for the latter provided with a chamber having ports adapted to register with the reservoir passage, of a plunger provided with an axial oil passage whose outlet is adapted to communicate with the cap chamber and whose inlet is adapted to communicate with the oil cup, for the purpose set forth.

12. The combination with the oil cup C and its chambered cap provided with a supply duct 7 having its inlet in the upper face of said cap and its outlet in the bottom of the chamber thereof, of the screw plug P provided with a flange projecting over the inlet of the supply duct to close the same.

13. The combination with the oil cup provided with a tubular stem and with a passage leading from the bore of said stem to the upper face of the cup, and a cap provided with a chamber in communication with the aforesaid passage and with a supply duct having its inlet and outlet open to the atmosphere and to the interior of the cup respectively, of the screw plug P provided with an abutment projecting centrally therefrom and with a circular flange covering the inlet to the supply duct, and a gravity plunger having motion in the plane of the aforesaid abutment and provided with an axial oil passage whose outlet is adapted to communicate with the cap chamber and whose inlet is adapted to communicate with the interior of the cup, for the purpose set forth.

In testimony whereof I have hereto signed my name in the presence of two witnesses.

CHESTER ALEXANDER DELANEY.

Witnesses:
  G. F. JONES,
  R. J. ROUSE.